UNITED STATES PATENT OFFICE.

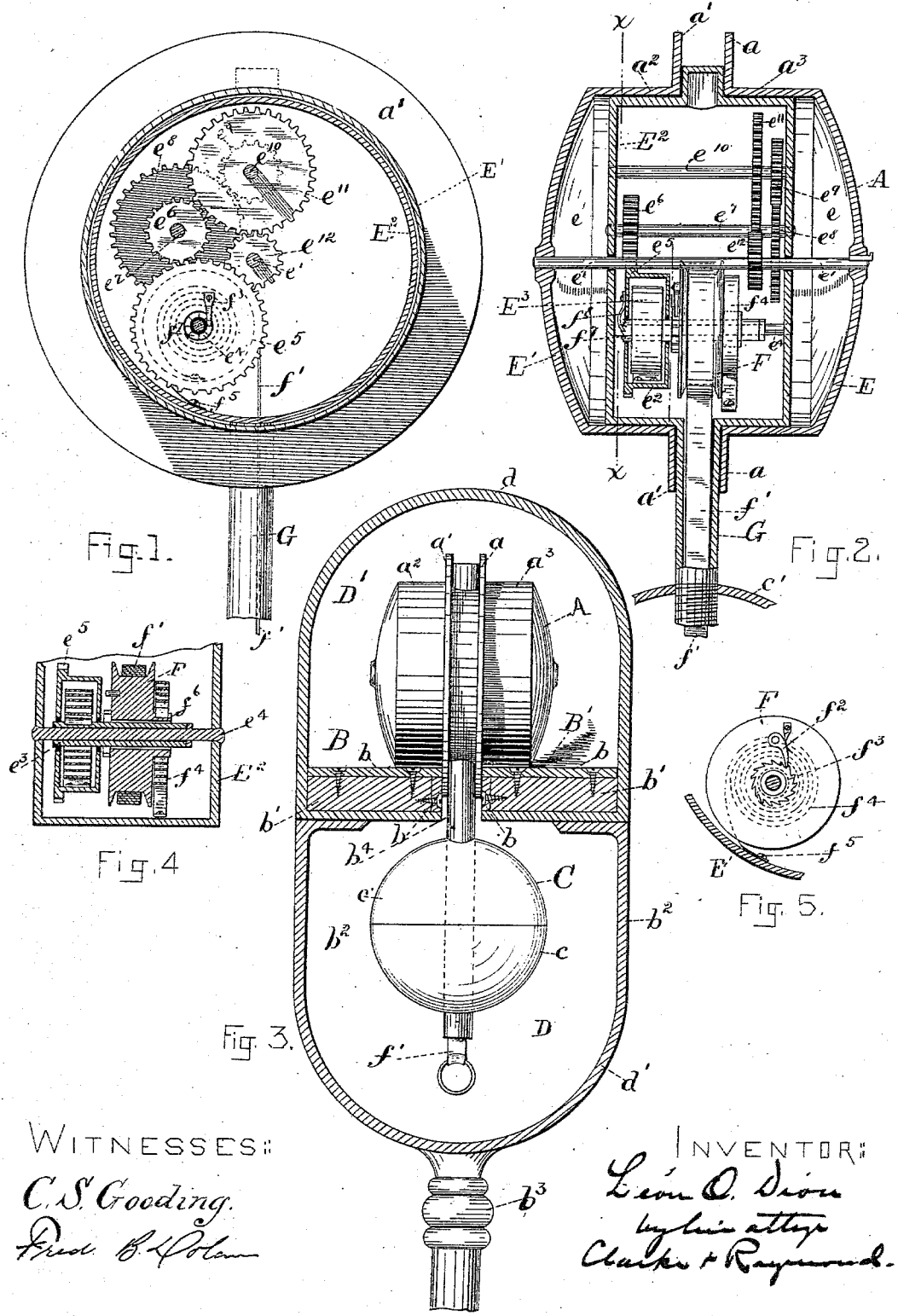

LÉON O. DION, OF NATICK, MASSACHUSETTS.

CASH-CARRYING SYSTEM.

SPECIFICATION forming part of Letters Patent No. 302,988, dated August 5, 1884.

Application filed April 9, 1884. (No model.)

*To all whom it may concern:*

Be it known that I, LÉON O. DION, of Natick, in the county of Middlesex and State of Massachusetts, have invented a new and useful Improvement in Cash-Carrier Systems, of which the following is a full, clear, and exact description, reference being had to the accompanying drawings, forming a part of this specification in explaining its nature, in which—

Figure 1 represents in vertical section, on the line $x\ x$ of Fig. 2, a motor used in connection with my system. Fig. 2 is a view, part in cross-vertical section and part in elevation, of the motor. Fig. 3 represents in front elevation the motor and its attachment, and in section the track upon which it runs. Figs. 4 and 5 are detail views, illustrating the construction, reference to which will hereinafter be made.

The invention consists in a cash-carrier system employing a self-propelling motor for supporting and transferring a receptacle. The power which I prefer to use in propelling the motor is a coiled spring, and I make the motor cylindrical in shape, and provide it with flanges, whereby it may be properly supported upon a track, as hereinafter shown.

Referring to the drawings, A represents the motor; B B', the tracks, and C the receptacle for holding the cash and other articles. The tracks B B' are preferably made of horizontal and vertical metal plates $b$, and these plates are fastened by screws, or bolted to supports or stringers $b'$. These stringers are carried or supported by brackets $b^2$, which are sustained either by posts $b^3$ or in any other desirable way. The tracks B B' are separated from each other by the space $b^4$, into which the flanges $a\ a'$, projecting from the motor, extend. The motor, as above stated, is made cylindrical in shape, and the cylindrical surfaces $a^2\ a^3$ bear upon the upper surface of the tracks, while the flanges $a\ a'$ extend into the opening between the tracks and bear upon their outer sides against the vertical plates $b$ of the tracks, and the tracks may be inclosed, except at points where openings are necessary for the purpose of reception or delivery, by continuous hoods or casings $d\ d'$, which in substance form passages D D'. (See Fig. 3.) When the motor has an independent money-receptacle, I prefer to hang it therefrom, as represented in Fig. 3; but I desire at this point to state that the receptacle for the cash may be within the motor itself; and in the one herein represented such spaces exist in the sections $e$, and any suitable openings thereto may be provided. I do not, however, intend to confine myself to this especial form of casing to the motor, and may arrange the receptacle in any other convenient place therein. The motor is preferably made in what may be called three parts—namely, the parts E, E', and $E^2$. The parts E E' are the portions which revolve, and comprise the principal part of the casing. They have the cylindrical surfaces $a^2\ a^3$ and also the flanges $a\ a'$, and they (or one of them) are positively revolved by the spring-motor. The part $E^2$, when a supplemental holder or receptacle, C, is employed, does not revolve with the parts E E'. This section $E^2$ is a casing, which has a bearing upon the shaft $e'$, and it is made somewhat smaller than the interior cavity of the shell E E', so that they shall not come in contact with its outer cylindrical surface. The shaft $e'$ carries at its ends the sections E E', one or both of which are keyed thereto, and it is revolved by means of the coiled spring $E^3$, which has its outer end fastened to the barrel $e^2$ and its inner end to the sleeve $e^3$ on the cross-rod $e^4$. The barrel $e^2$ revolves upon this sleeve, and has the spur-wheel $e^5$, which meshes with the pinion $e^6$ upon the shaft $e^7$. This shaft carries the spur-wheel $e^8$, which in turn meshes with the pinion $e^9$ on the shaft $e^{10}$, which carries the spur-wheel $e^{11}$, which engages with a pinion, $e^{12}$, on the main shaft $e'$, so that the force of the spring is transmitted to the main shaft. The spring may be wound either by a key in the usual way, in which case the sleeve $e^3$ will be extended to the outer edge of the casing, or by means of a tape, chain, or cord, to which, preferably, the lower section, $c$, of the independent receptacle is attached. When this construction is employed, the motor is never removed from the track, and the spring is wound up upon the pulling down of the receptacle $c$, and the motor will have the drum F upon the sleeve $e^3$, free to revolve thereon, and to which the end of the tape, cord, or chain $f'$ is fastened. Upon one side of this drum is placed the spring-pawl $f^2$, which engages with the ratchet $f^3$, keyed to the sleeve $e^3$, so that the movement of the barrel in one direction will cause the sleeve to be revolved, and therefore the mainspring $E^3$; and if this movement is in the direction necessary for winding it will of course wind up the spring. Therefore, upon drawing the tape, cord, or chain downward, the pawl engages with the ratchet and winds the mainspring. As, however, it is necessary that the chain, tape, or cord should be returned automatically after it has been drawn out, I provide the drum with a coiled spring, $f^4$, the outer end, $f^5$, of which is fastened to the casing $E^2$ and the inner end to a hub or extension, $f^6$, of the drum. This spring is wound up upon the unwinding of the tape, cord, or chain, and consequently, when the tape, cord, or chain is released, it causes the drum to revolve, and automatically winds the tape, cord, or chain thereon; but as the drum is thus moved in an opposite direction from that employed in winding the mainspring, the pawl $f^2$ rides over the ratchet-teeth $f^3$. The drum $e^5$ is connected with the sleeve $e^3$ by means of the crown ratchet-wheel $f^7$ at the end of the sleeve $e^3$, and the spring-pawl $f^8$ attached to the drum.

When the independent receptacle C is used I prefer to extend down from the section $E^2$ the tubular extension G, through which the cord, tape, or chain $f'$ extends, and which carries or supports at its lower end the upper portion, $c'$, of the receptacle; and the lower portion, $c$ of the money-receptacle I prefer to attach to the cord, tape, or chain, so that upon the downward movement thereof it is separated from the upper part and drawn down with the cord, tape, or chain, and upon the reverse or upward movement thereof is drawn back to its original position, and automatically locks or comes in contact with and is held, by the force of the spring $f^4$, against the section $c'$. I do not, however, confine myself to this form of independent cash-receptacle, but may use any other which shall be adapted to be carried by the motor herein specified.

It will be seen that by covering the tracks with the hood $d$ the carrier is concealed from view, and also that the casing may be used for the support or display of goods.

The advantages of this system consists in the cheapness of construction and efficiency of service which arise from the use and employment of a self-propelling carrier, and also from the fact that a level track can be employed, thereby rendering the system applicable to low-studded stores and buildings.

Having thus fully described my invention, I claim and desire to secure by Letters Patent of the United States—

1. In a cash-carrier system, a motor or self-propelling carrier supporting or carrying a receptacle for money and other articles, all substantially as and for the purposes described.

2. As a cash-carrier system, the tracks B B', and a motor or self-propelling carrier, supporting or holding a receptacle or tray, and adapted to be supported and guided by the tracks, all substantially as and for the purposes described.

3. A cash-carrier supporting or holding a tray or receptacle, and having a positively-revolved cylindrical section adapted to bear upon a track and by traction thereon cause the movement of the carrier and receptacle, all substantially as and for the purposes described.

4. The combination of the self-propelling cash-carrier, consisting of the sections E E' and mechanism, substantially as specified, for automatically revolving one or both of said sections carried thereby, all substantially as and for the purposes set forth.

5. The combination of the sections E E' $E^2$ and mechanism, substantially as specified, for automatically revolving one or more of said sections, all substantially as and for the purposes described.

6. In a cash-carrier, the combination of the sections E E' $E^2$, containing mechanism, substantially as specified, for automatically propelling the same upon the tracks, and the independent receptacle C, all substantially as and for the purposes described.

7. The combination, in a cash-carrier, of the motor A, the receptacle, holder, or tray C, adapted to be drawn from the motor, and intermediate connecting mechanism, substantially as specified, whereby the holder is vertically movable in relation to the motor, all substantially as and for the purposes described.

8. The combination of the motor A, the actuating device of which is a coiled spring, and mechanism, substantially as described, for winding the same by means of a tape, cord, or chain, $f'$, all substantially as and for the purposes described.

9. As a cash-carrier, a motor, A, having the bearing surfaces $a^2$ $a^3$, and the flanges $a$ $a'$, all substantially as and for the purposes described.

10. The combination of the tracks B B', with the hood $d$, all substantially as and for the purposes described.

11. The combination of the casing $d$ $d'$, forming the passages D D', and the tracks B B', all substantially as and for the purposes described.

12. In a cash-carrier system, the tracks B B', separated by the opening or space $b^4$, all substantially as and for the purposes described.

13. A device for a cash-carrier system adapted to be propelled by an actuating spring supported by said device, and mechanism, substantially as specified, all as and for the purposes described.

LÉON O. DION.

Witnesses:
F. F. RAYMOND, 2d,
E. A. PHALEN.